Feb. 7, 1939.  J. HARTMANN  2,146,573
FLUORESCENT SCREEN AND A METHOD OF MANUFACTURING THE SAME
Filed April 24, 1937   2 Sheets-Sheet 2

INVENTOR
JOSEPH HARTMANN
BY
ATTORNEYS

Patented Feb. 7, 1939

2,146,573

UNITED STATES PATENT OFFICE 2,146,573

FLUORESCENT SCREEN AND A METHOD OF MANUFACTURING THE SAME

Joseph Hartmann, Rudolstadt, Germany

Application April 24, 1937, Serial No. 138,714
In Germany May 24, 1930

8 Claims. (Cl. 250—80)

This invention relates to X-ray photography and refers more particularly to fluorescent screens and a method of manufacturing the same.

The present application is a continuation-in-part of my co-pending U. S. Patent application Serial No. 536,954, filed May 12, 1931, which matured into Patent No. 2,088,595, issued August 3, 1937.

In the art of producing X-ray images fluorescent screens are used for the purpose of diminishing the time of exposure during photography. These screens comprise a fluorescent layer which may or may not be supported by a base. The fluorescent layer comprises crystals constituting the fluorescent material of the screen; this crystalline fluorescent material is embedded in a binding material, the binding material and the fluorescent material together constituting the fluorescent layer.

The fluorescent screens are usually placed between the source of X-rays and a sensitized layer of a photographic film or plate. The purpose of these screens is to increase the effect made by the X-rays upon the sensitized layer. The effect of various screens may be measured by comparing the efficiency of light and, consequently, the coefficient of strengthening of each screen. Naturally, an important aim in constructing the screens is to obtain the best possible efficiency of light and the most favorable coefficient of strengthening.

A drawback of fluorescent screens known in prior art is that the outlines of a picture produced upon a sensitized layer are much less fine when fluorescent screens are used, than would be the case if no screen were used during the exposure.

In other words, while a fluorescent screen performs the function of increasing the effect of X-rays reaching a sensitized layer, this screen at the same time produces a blurred picture upon the sensitized layer.

Heretofore, fluorescent screens comprised a base which was strongly reflecting for the purpose of obtaining the greatest possible output of light. I have discovered that the reason why fluorescent screens tend to blur X-ray photographs and to diminish the fineness of outlines thereof is due to the use of such reflecting bases.

An object of the present invention is the provision of a fluorescent screen which will have an adequate strengthening coefficient and which at the same time will not diminish the fineness of outlines of an X-ray photograph obtained upon the sensitized layer of a photographic film or plate.

The above and other objects of the present invention may be realized by providing a fluorescent screen, the base of which will not reflect light emerging from the fluorescent layer. This may be accomplished, for example, by using a base which is not only black, but non-reflectant as well, or by using a base which is so colored that it absorbs light rays of those wave lengths which produce an image upon the sensitized layer of a photographic film or plate.

For example, the base of a fluorescent screen may consist of a sheet of cardboard the supporting surface of which is covered by a black non-reflecting paint.

In the case of fluorescent screens which do not have a base, the same result may be achieved by coating the reverse surface of the fluorescent layer with black non-reflecting paint.

I have also found that the fineness of outlines of an X-ray photograph obtained when using a fluorescent screen may be further improved if the fluorescent layer of the fluorescent screen is made comparatively thin, for example, .04 mm. to .08 mm. thick.

Practical experiments have shown that when a fluorescent layer of such thickness is used, the outlines of a photograph obtained upon a film or plate will be as fine as those of a photograph obtained without the use of the fluorescent screen, provided, of course, that in each case the film was blackened in the same way. At the same time the fluorescent screen will diminish the time necessary for exposure to a considerable extent.

In other words, a thin fluorescent screen of the described type retains its advantage of considerably diminishing the time necessary for exposure and at the same time does not diminish the fineness of outlines of the photographic image.

Of course, better results are obtained by the use of a fluorescent screen which combines these features, i. e. by the use of a fluorescent screen having a fluorescent layer which is .04 to .08 mm. thick and also having a base the supporting surface of which (or the reverse surface of the fluorescent layer) is non-reflectant at least with regard to those rays of light which affect the sensitized layer of a film or plate to produce a photographic image thereon.

The effect of such screen is still further increased if its fluorescent layer is made non-reflectant with respect to light emerging therefrom. This may be accomplished by coloring the fluorescent material, the binding material, or both, with a color or colors which will absorb light of the same wave length as that which is emitted by the fluorescent material.

The invention would appear more clearly from the following detailed description when taken in connection with the accompanying drawings showing by way of example preferred embodiments of the inventive idea.

Figure 1:
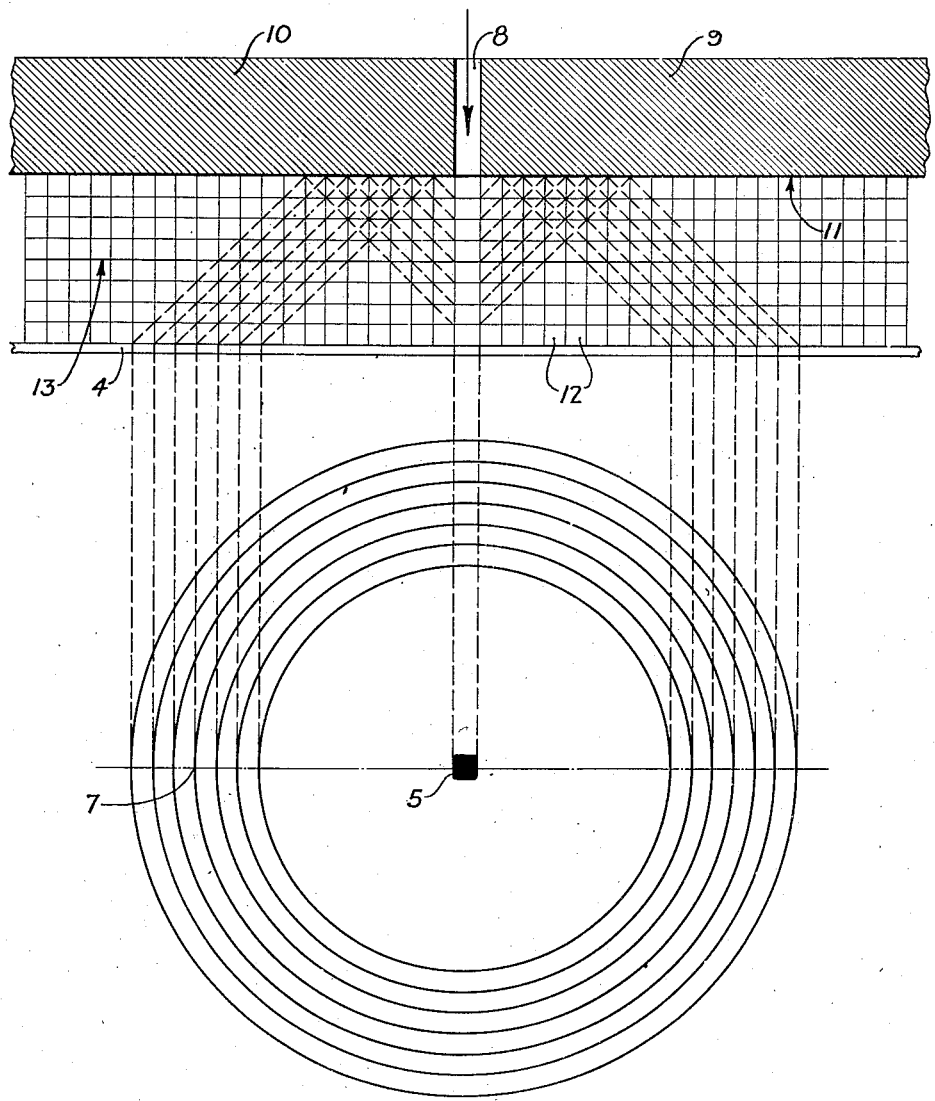
Figure 1 is a diagram illustrating the diffusion of light caused by a fluorescent screen.

Figure 1 shows two sheets or plates 9 and 10 which are made of lead and which are provided with an opening 8 for the passage of X-rays. The reverse surface 11 of the plates 9 and 10 carries a fluorescent layer 13. For simplicity's sake, the binding material constituting a part of the fluorescent layer is not shown at all in the drawings while the crystals 12 constituting the fluorescent material of the fluorescent layer 13 are represented as being cubes although actually they have the shape of a more complicated geometrical figure.

A photographic film 4 is placed over the fluorescent layer 13 and is in contact therewith.

The X-rays emerging from a source not shown in the drawings pass through the opening 8 and produce a dark spot 5 upon the film 4. However, some of the rays of light are reflected by the crystals and are directed against the surfaces 11 of the plates 9 and 10. Then the same light rays are again reflected by the surfaces 11 and pass through the fluorescent layer 13 until they reach the film 4. These reflected rays of light do not reach the spot 5, but form circles 7 around the spot which diminishes the fineness of outlines of the image produced upon the photographic film 4.

Figure 1 indicates that the circles 7 upon the film 4 may be eliminated by the following two methods:

In the first place, the fluorescent layer 13 should be made as thin as possible, since then the rays of light will not have to traverse large distances within the fluorescent layer itself, with the result that the circles 7 will be situated much nearer to the spot 5 than would be the case if a comparatively thick fluorescent layer were used.

In the second place, the circles 7 may be eliminated entirely, or at least to a substantial extent, by making the surfaces 11 non-reflectant; then the light rays reflected by the crystals 12 and falling on the surfaces 11 will be absorbed by these surfaces and will not reach the film 4 at all.

Figure 2:
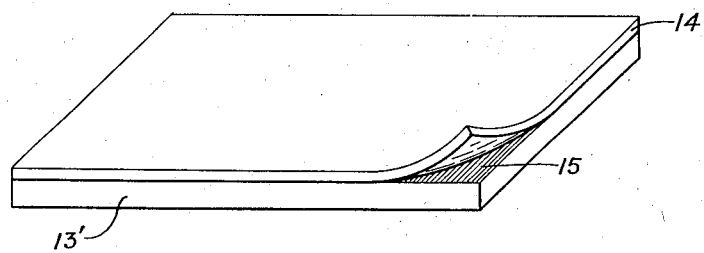
Figure 2 is a perspective view of a fluorescent screen constructed in accordance with the present invention.

Figure 2 shows a fluorescent screen constructed in accordance with the principles of the present invention. This screen comprises a base 13' carrying a fluorescent layer 14. As already mentioned, the fluorescent layer 14 consists of crystalline fluorescent material imbedded in a binding substance; for simplicity's sake, these two component parts of the fluorescent layer are not shown separately in the drawings.

In Figure 2 one corner of the fluorescent layer 14 is shown as being bent away from the base 13' in order to indicate that the surface 15 of the base 13' is non-reflectant, for example, covered with black non-reflectant paint.

As already mentioned, the fluorescent layer 14 should be comparatively thin. I have found that in order to obtain photographic images with very fine outlines, the fluorescent layer 14 should be thinner than one tenth of a millimeter. The thickness of the fluorescent layers 14 and 17, shown in Figures 2 and 3, may range between .04 to .08 mm. However, when extremely fine outlines are not necessary, the fluorescent layers may have the usual thickness of .12 to .20 mm.

Figure 3:
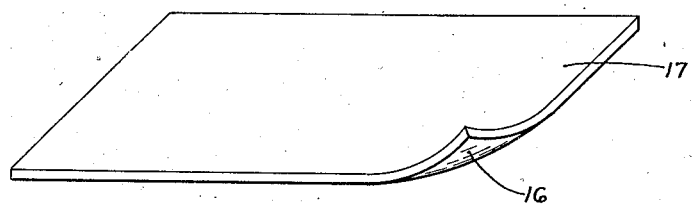
Figure 3 shows a fluorescent screen of a somewhat different type.

As shown in Figure 3, it is possible to dispense with the use of the base by coating the surface 16 of the fluorescent layer 17 with a paint which would make the surface 16 non-reflectant, so that it would absorb rays of light reflected upon it by the crystals of the fluorescent layer 17.

The fluorescent material or the binding material, or both the fluorescent material and the binding material, of the fluorescent screens shown in Figures 2 and 3 may be made non-reflectant by coloring it or them with a color or colors which will absorb light of the same wave length as that which is emitted by the fluorescent material.

What is claimed is:

1. As an article of manufacture, a fluorescent screen for X-ray work, having a fluorescent layer and a base for said layer, wherein that surface of said base which is nearest to said layer is blackened to be non-reflectant with respect to the light emerging from said fluorescent layer, for the purpose of diminishing the reflected and diffused fluorescent light emerging from parts of said layer.

2. As an article of manufacture, a fluorescent screen for X-ray work, having a fluorescent layer and a base for said layer, wherein that surface of said base which is nearest to said layer is blackened to be non-reflectant and said layer is made non-reflectant by the addition of a pigment with respect to light rays emerging from parts of said layer.

3. As an article of manufacture, a fluorescent screen having a fluorescent layer comprising a fluorescent material and means for binding said material; and a base for said layer, wherein that surface of said base which is nearest to said layer is blackened to be non-reflectant and said binding means are made non-reflectant by the addition of a pigment with respect to light rays emerging from said fluorescent material.

4. As an article of manufacture, a fluorescent screen having a fluorescent layer comprising a fluorescent material and means for binding said material; and a base for said layer, wherein that surface of said base which is nearest to said layer is blackened to be non-reflectant and said layer is made non-reflectant by the addition of a pigment with respect to the fluorescent light.

5. As an article of manufacture, a fluorescent screen for X-ray work, having a fluorescent layer comprising a fluorescent material and means for binding said material; and a base for said layer, wherein a part of said base is blackened to be non-reflectant and wherein said fluorescent material and said binding means are made non-reflectant by the addition of a pigment with respect to the light emerging from said fluorescent material.

6. As an article of manufacture, a fluorescent screen for X-ray work, having a fluorescent layer of a thickness which is less than one tenth of a millimeter and a base for said layer, wherein that surface of said base which is nearest to said layer is blackened to be non-reflectant with respect to light rays emerging from parts of said layer.

7. In a fluorescent screen for X-ray work, a fluorescent layer having a front surface and a back surface, said fluorescent layer comprising a fluorescent material which reflects the fluorescent light toward said back surface, and blackening means adjacent said back surface for absorbing the reflected fluorescent light.

8. In a fluorescent screen for X-ray work, a fluorescent layer having a front surface and a back surface, said fluorescent layer comprising a fluorescent material which reflects the fluorescent light toward said back surface, and a blackening coating covering said back surface, said coating being for practical purposes non-reflectant with respect to the fluorescent light.

JOSEPH HARTMANN.